(12) United States Patent
Gehle et al.

(10) Patent No.: US 11,034,451 B2
(45) Date of Patent: Jun. 15, 2021

(54) AIRCRAFT CABIN LIGHTING ARRANGEMENT FOR ILLUMINATING A COMMON SPACE OF AN AIRCRAFT, AIRCRAFT COMPRISING THE SAME, AND METHOD OF OPERATING AN AIRCRAFT CABIN LIGHTING ARRANGEMENT

(71) Applicant: Goodrich Lighting Systems GmbH, Lippstadt (DE)

(72) Inventors: Anica Gehle, Paderborn (DE); Kerri Vencato, Phoenix, AZ (US); Meghan Elizabeth Blake, Charlotte, NC (US); Robert Schulten, Muenster (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 16/137,667

(22) Filed: Sep. 21, 2018

(65) Prior Publication Data

US 2019/0092472 A1 Mar. 28, 2019

(30) Foreign Application Priority Data

Sep. 22, 2017 (EP) .................................. 17192558.9

(51) Int. Cl.
*B64D 11/00* (2006.01)
*B60Q 3/60* (2017.01)
(Continued)

(52) U.S. Cl.
CPC ................ *B64D 11/00* (2013.01); *B60Q 3/43* (2017.02); *B60Q 3/47* (2017.02); *B60Q 3/60* (2017.02);
(Continued)

(58) Field of Classification Search
CPC ... B60Q 3/43; B60Q 3/47; B60Q 3/60; B64D 11/00
See application file for complete search history.

(56) References Cited

U.S. PATENT DOCUMENTS

| 2004/0052076 A1* | 3/2004 | Mueller | F21V 23/0442 |
| | | | 362/293 |
| 2009/0112407 A1* | 4/2009 | Kneller | B64D 11/0015 |
| | | | 701/45 |

(Continued)

FOREIGN PATENT DOCUMENTS

| DE | 20203007 U1 | 5/2002 |
| GB | 2293443 A | 3/1996 |

(Continued)

OTHER PUBLICATIONS

Extended European Search Report for International Application No. 17192558.9 dated Mar. 5, 2018, 8 pages.

*Primary Examiner* — Leah Simone Macchiarolo
(74) *Attorney, Agent, or Firm* — Cantor Colburn LLP (57) ABSTRACT

An aircraft cabin lighting arrangement for illuminating a common space of an aircraft, includes a light output lens for passing light for illuminating said common space of the aircraft, a plurality of light sources having different light emission spectra, the plurality of light sources being arranged for light emission through the light output lens, and a detector for detecting a person's presence in the common space. The aircraft cabin lighting arrangement has at least a nominal day time mode of operation having a first light output, an intermediate mode of operation having a second light output, and a nominal night time mode of operation, and is configured to switch from the nominal night time mode of operation to the intermediate mode of operation as a response to the detector detecting a person's presence in the common space.

11 Claims, 5 Drawing Sheets

(51) Int. Cl.
*B60Q 3/43* (2017.01)
*B64D 47/02* (2006.01)
*B60Q 3/47* (2017.01)
*H05B 47/105* (2020.01)
*F21V 23/04* (2006.01)
*F21Y 113/00* (2016.01)

(52) U.S. Cl.
CPC ........... *B64D 47/02* (2013.01); *H05B 47/105* (2020.01); *B64D 2011/0038* (2013.01); *B64D 2203/00* (2013.01); *F21V 23/0471* (2013.01); *F21Y 2113/00* (2013.01)

(56) References Cited

U.S. PATENT DOCUMENTS

| | | | |
|---|---|---|---|
| 2010/0012780 A1* | 1/2010 | Kohlmeier-Beckmann | B64D 11/00 244/118.5 |
| 2012/0306384 A1 | 12/2012 | Chen | |
| 2014/0267975 A1* | 9/2014 | Ying | G09F 9/33 349/58 |
| 2014/0313751 A1* | 10/2014 | Abel | B64D 11/00 362/464 |
| 2015/0251594 A1* | 9/2015 | Timm | B64D 11/00 362/471 |
| 2016/0345401 A1* | 11/2016 | Hessling-Von Heimendahl | B60Q 1/1423 |
| 2016/0345408 A1* | 11/2016 | Schoen | B64D 47/04 |
| 2016/0353551 A1* | 12/2016 | Despres | F21V 23/0471 |
| 2017/0189640 A1 | 7/2017 | Sadwick | |
| 2017/0283086 A1* | 10/2017 | Garing | B64D 11/0638 |
| 2018/0281673 A1* | 10/2018 | Garing | B60Q 3/47 |

FOREIGN PATENT DOCUMENTS

| | | |
|---|---|---|
| GB | 2506380 A | 4/2014 |
| WO | 2016145059 A1 | 9/2016 |
| WO | 2016191560 A1 | 12/2016 |

\* cited by examiner

AIRCRAFT CABIN LIGHTING ARRANGEMENT FOR ILLUMINATING A COMMON SPACE OF AN AIRCRAFT, AIRCRAFT COMPRISING THE SAME, AND METHOD OF OPERATING AN AIRCRAFT CABIN LIGHTING ARRANGEMENT

FOREIGN PRIORITY

This application claims priority to European Patent Application No. 17192558.9 filed Sep. 22, 2017, the entire contents of which is incorporated herein by reference.

TECHNICAL FIELD

The present invention is in the field of interior aircraft lighting. In particular, the present invention is in the field of illumination of common spaces of aircraft, such as galley areas, wash rooms, and wash room waiting areas.

BACKGROUND

Modern passenger airplanes have a vast range of interior lighting. For example, modern airplanes have general cabin illumination lights, individual reading lights for the passengers, emergency exit lights, other signal lights, such as fasten seat belt and wash room indication lights, wash room illumination lights, and galley illumination lights. The lights serve multiple purposes, such as safety purposes, passenger convenience, and the provision of a well-lit work environment for the crew. Commonly, the general cabin illumination lights have a nominal day time mode of operation and a nominal night time mode of operation. The nominal day time mode of operation is commonly used during day time flight situations and shortly after take-off and before landing in night time flight situations. The nominal night time mode of operation is commonly used during night time flight situations, when the passengers are intended to rest, e.g. between meals. When moving around the cabin in night time flights, in particular when moving from the seating portions of the cabin to the galley and wash room portions of the cabin, present day cabin illumination systems are not perceived as fully satisfactory to the passengers.

Accordingly, it would be beneficial to provide an aircraft cabin lighting arrangement, an aircraft comprising the same, and a method of operating an aircraft cabin lighting arrangement that allow for an improved illumination of the cabin, in particular for a more pleasant illumination for the passengers when moving around the cabin.

SUMMARY

Exemplary embodiments of the invention include an aircraft cabin lighting arrangement for illuminating a common space of an aircraft, such as a galley area, a wash room, or a wash room waiting area, comprising a light output lens for passing light for illuminating said common space of the aircraft, a plurality of light sources having different light emission spectra, the plurality of light sources being arranged for light emission through the light output lens, and a detector for detecting a person's presence in the common space; wherein the aircraft cabin lighting arrangement has at least a nominal day time mode of operation having a first light output, an intermediate mode of operation having a second light output, and a nominal night time mode of operation, wherein the aircraft cabin lighting arrangement is configured to switch from the nominal night time mode of operation to the intermediate mode of operation as a response to the detector detecting a person's presence in the common space, and wherein the second light output has a lower relative light emission power below a threshold wavelength than the first light output.

Exemplary embodiments of the invention allow for a gentle illumination of common spaces that is less disturbing to the passengers' circadian rhythm than prior approaches, where the comparably very low night time illumination of the passenger portions/seating portions of the cabin is paired with a comparably very bright illumination of the galley areas, wash room waiting areas and wash rooms. In such previous approaches, the passenger experiences a sharp contrast between the seating portions of the cabin and the galley areas and wash rooms, which are lit in the same bright manner and with the same light spectrum during night time as during day time. As compared to such disturbing infliction of light onto the passenger, exemplary embodiments of the aircraft cabin lighting arrangement, as described herein, allow for a pleasing experience to the passenger, when moving around the cabin at night. The automatic switching to the intermediate mode of operation allows for a strong dimming of the light output, i.e. an operation in a nominal night time mode of operation, when no passenger or crew member is around, thus keeping the stray light into the seating portions of the aircraft cabin low. The automatic switching upon detection of a human's presence ensures that the passengers and crew members can safely and effortlessly roam through the common space, because illumination may be provided when needed. Also, given that the passengers and crew members generally reach the common space from the very dimly lit aisles of the passenger portions of the cabin, the intermediate mode of operation may be perceived as providing a sufficient, yet not disturbing illumination.

The lower relative light emission power below the threshold wavelength provides for a lower disturbance of a passenger's rest phase than the usage of the first light output of the nominal day time mode of operation. As lower wavelengths in the visible light spectrum have a greater effect on the human circadian rhythm, providing the second light output with a lower relative light emission power below a threshold wavelength, as compared to the first light output, keeps the awakening effect on passengers low, when going to the wash rooms or getting something to drink or eat from the galley areas. In other words, the lower relative light emission power below the threshold wavelength provides for a smaller awakening effect on the passenger and allows for the passenger to rest or go to sleep more easily after returning to the seating portion of the cabin. An optimized compromise between providing sufficient illumination in common spaces of aircraft, keeping stray illumination low, and keeping the disturbance of passengers' rest phases low may be achieved by the aircraft cabin lighting arrangement in accordance with exemplary embodiments of the invention.

The aircraft cabin lighting arrangement comprises a plurality of light sources having different light emission spectra. By operating different light sources in the different modes of operation and/or by operating the light sources with different dimming levels in the different modes of operation, different spectral compositions of the light outputs may be achieved. In particular, the lower relative light emission power below the threshold wavelength may be achieved by relying on light sources that have their light output in narrow bands above the threshold wavelength and/or by relying on light sources that have a wide band light emission, but have a comparably large amount of spectral components above the threshold wavelength.

The second light output has a lower relative light emission power below a threshold wavelength than the first light output. The relative light emission power may be measured in accordance with one of the following two metrics. Both metrics use the spectrum of visible light, as emitted by the first and second light outputs, as the starting point. According to the first metric, the peak intensity levels below the threshold wavelength are compared between the first light output and the second light output. According to the second metric, the total light emission power, i.e. the integral over all visible wavelengths below the threshold wavelength, is compared between the first light output and the second light output. As low wavelengths in the visible light spectrum correspond to blue light, the second light output may also be referred to as having a lower blue light content than the first light output.

The aircraft cabin lighting arrangement has a plurality of light sources and a light output lens, through which the light from the plurality of light sources is passed for illuminating the common space. In particular, the aircraft cabin lighting arrangement may have a housing, in which the plurality of light sources are arranged. The housing may be closed by the light output lens. Further, the housing may be arranged in a corresponding recess in a wall portion or a ceiling portion of a galley area, a wash room, or a wash room waiting area. The detector may be arranged in the housing together with the plurality of light sources, in which case the aircraft cabin lighting arrangement forms an integrated light unit. It is also possible that the detector is arranged outside of, and potentially spaced from, the housing. The detector may send an electric signal indicating a person's presence to the other components of the aircraft cabin lighting arrangement.

The aircraft cabin lighting arrangement has at least the nominal day time mode of operation, the intermediate mode of operation, and the nominal night time mode of operation. The total light output is higher in the nominal day time mode of operation than in the intermediate mode of operation, which in turn is higher than in the nominal night time mode of operation. The aircraft cabin lighting arrangement may have further modes of operation in addition to those three modes of operation. For example, the aircraft cabin lighting arrangement may have an off mode of operation, where no light is emitted. As described above, the aircraft cabin lighting arrangement is configured to switch from the nominal night time mode of operation to the intermediate mode of operation in response to the detector detecting a person's presence in the common space. While the aircraft cabin lighting arrangement has such a setting, it may additionally have a setting where the second light output is emitted, irrespective of the detector's operation. In other words, it is also possible that the aircraft cabin lighting arrangement may be set to constantly emit the second light output. In this way, the crew may choose between the automatic switching described above and a constant illumination of the common space with the second light output. It is stressed again that other modes of operation are possible in addition.

According to a further embodiment, the threshold wavelength is between 450 nm and 500 nm. Having the threshold wavelength between 450 nm and 500 nm and providing a lower relative light emission power below the threshold wavelength in the second light output than in the first light output allows for an effective reduction of those wavelengths that cause the most distress to the human circadian rhythm. The threshold wavelength may in particular be between 470 nm and 480 nm. Further in particular, the threshold wavelength may be 475 nm.

According to a further embodiment, the second light output has a lower correlated color temperature than the first light output. In particular, both the first light output and the second light output may be perceived as white light, however with the second light output being a warmer shade of white light. Such a warm shade of white light is less disturbing to a person's state of rest than a colder, more neutral shade of white light. The correlated color temperature of the second light output may be below 3500 K. In particular, the correlated color temperature of the second light output may be between 2700 K and 3000 K. The correlated color temperature of the first light output may be above 3500 K. In particular, the correlated color temperature of the first light output may be between 3500 K and 6000 K.

According to a further embodiment, the plurality of light sources are a plurality of LEDs. In particular, the plurality of light sources are a plurality of LEDs with different light emission spectra. While various of the light sources/LEDs may have the same light emission characteristics, there are at least two light sources/LEDs with different light emission characteristics. In particular, there may be two groups of light sources/LEDs, with the light sources/LEDs within one group having the same or similar light emission characteristics, but with the light sources/LEDs of different groups having significantly different light emission characteristics, such as different colors or shades of colors.

According to a further embodiment, a first subset of the plurality of light sources is dominant in the nominal day time mode of operation and a second subset of the plurality of light sources, different from the first subset, is dominant in the intermediate mode of operation. In particular, a subset of light sources may be referred to as dominant if it contributes more than 60%, in particular more than 70%, further in particular more than 80% to the total light output of the aircraft cabin lighting arrangement. The first or second subset of light sources being dominant may be achieved by only operating the first or second subset of light sources, respectively, or by respectively dimming down one of the two subsets of light sources relative to the other subset. The first and second subsets of light sources may be light sources of different colors/different shades of colors. Having different subsets of light sources and operating these different subsets differently in the different modes of operation provides for an effective and convenient way of implementing the different modes of operation. In particular, by relying on different light sources with different light emission characteristics, no optical filters, in particular no mechanically operated optical filters, are required for adapting the light output.

According to a further embodiment, the first subset of the plurality of light sources comprises at least one neutral white LED and/or the second subset of the plurality of light sources comprises at least one warm white LED. In particular, the first subset of the plurality of light sources may comprise a plurality of neutral white LEDs and/or the second subset of the plurality of light sources may comprise a plurality of warm white LEDs. In this way, the passengers, when being in the common space illuminated by the second light output, experience a natural white illumination and are able to orient themselves and find their way well, while not being overly disturbed in their state of rest due to the warm white shade of light. A good compromise between a natural perception of the common space and a low disturbance of the circadian rhythm may be achieved.

According to a further embodiment, the detector is a motion detector or an infrared detector or a combined motion and infrared detector. The term motion detector refers to any kind of detector that detects a person's motion in or towards the common space. For example, the motion detector may be a photo detector detecting a change in an image of the common space. It is also possible to use detectors based on the changing reflection of acoustic or electromagnetic waves. The term infrared detector relates to any kind of detector that senses the emission of body heat. For example, the infrared detector may compare a sensed level of infrared waves to a predetermined threshold level and may derive a person's presence if the sensed level of infrared waves is above the predetermined threshold. While the terms motion detector and infrared detector are generally used herein for denoting different concepts of detecting a person's presence, it is also possible that a motion detector relying on changes in the sensed infrared emission is used. It is further possible that multiple concepts are combined for providing redundancy and a more reliable detection of a person's presence. In particular, a combined motion and infrared detector may be provided that has a motion detector and an infrared detector and a control logic that combines the output of the two detectors in a suitable manner for reliably determining a person's presence. It is pointed out that the term person's presence in the common space is intended to include a person's approximation to the common space, i.e. an expected future person's presence in the common space. For example, the detector may be targeted towards an aisle portion adjacent to the common space in question. While the aisle portion is by definition part of the seating portion of the aircraft, an activity within the aisle close to the common space in question may indicate an imminent person's presence in the common space.

According to a further embodiment, the aircraft cabin lighting arrangement is configured to switch from the nominal night time mode of operation to the intermediate mode of operation via an up-dimming transition. In this way, the person entering the common space is provided with illumination of the common space in a transient manner, thus ensuring a smooth adjustment of the person's eyes to the changing illumination. This up-dimming transition also helps in keeping the awakening effect of the illumination for the passengers low. The up-dimming transition may last between 0.2 s and 2 s, in particular between 0.5 s and 1.5 s. These values have been found to provide a good compromise between a smooth transition and a quick provision of illumination, allowing for the passengers and crew members to find their way quickly. In a particular embodiment, the up-dimming transition may follow an s-shaped dimming curve. In particular, the up-dimming may start slowly, have an increased level of change in an intermediate part, and run out slowly towards the desired illumination level of the intermediate mode of operation.

According to a further embodiment, the aircraft cabin lighting arrangement is configured to switch from the intermediate mode of operation to the nominal night time mode of operation via a down-dimming transition. Such a down-dimming transition allows for a person's eyes to adjust slowly to a darker environment in the common space. Also, the down-dimming transition is a warning to a person in the common space of an imminent turning down of the illumination, which may for example be beneficial if the detector for some reason fails to detect an ongoing person's presence. The down-dimming transition may last between 2 s and 20 s, in particular between 5 s and 15 s. These values have been found to be particularly pleasing to the passengers eyes, in particular to those passengers seated adjacent to the common space in question. In a particular embodiment, the down-dimming transition may follow an s-shaped dimming curve. In particular, the down-dimming may start slowly, have a strong decrease in illumination level in an intermediate part, and run out slowly towards the desired illumination level of the nominal night time mode of operation.

According to a further embodiment, the aircraft cabin lighting arrangement is configured to switch from the intermediate mode of operation to the nominal night time mode operation as a response to the detector no longer detecting a person's presence in the common space. For example, the aircraft cabin lighting arrangement may be configured to switch from the intermediate mode of operation to the nominal night time mode of operation after a particular time span of no activity, i.e. a time span of no presence being detected, has elapsed. The particular time span may be any suitable time span, such as between 1 min and 5 min.

Exemplary embodiments of the invention further include an aircraft comprising at least one aircraft cabin lighting arrangement in accordance with any of the embodiments described above. The at least one aircraft cabin lighting arrangement may be arranged in at least one of a galley area, a wash room, and a wash room waiting area. The additional features, modifications, and effects, described above with respect to the aircraft cabin lighting arrangement, apply to the aircraft in an analogous manner.

According to a further embodiment, the at least one aircraft cabin lighting arrangement is arranged in a ceiling portion or a wall portion of said at least one of a galley area, a wash room, and a wash room waiting area. In particular, the light output lens may be flush with the ceiling portion or the wall portion.

According to a further embodiment, the aircraft is an airplane, in particular a passenger airplane, further in particular a large commercial passenger airplane.

Exemplary embodiments of the invention include a method of operating an aircraft cabin lighting arrangement for illuminating a common space of an aircraft, such as a galley area, a wash room, or a wash room waiting area, the method comprising emitting a first light output into the common space of the aircraft in a nominal day time mode of operation; emitting a second light output into the common space of the aircraft in an intermediate mode of operation, wherein the second light output has a lower relative light emission power below a threshold wavelength than the first light output; and emitting a third light output into the common space of the aircraft in a nominal night time mode of operation; wherein the method further comprises the following step: when operating in the nominal night time mode of operation and detecting a person's presence in the common space of the aircraft, switching from the nominal night time mode of operation to the intermediate mode of operation. The additional features, modifications, and effects, described above with respect to the aircraft cabin lighting arrangement, apply to the method of operating an aircraft cabin lighting arrangement in an analogous manner.

According to a further embodiment, the threshold wavelength is between 450 nm and 500 nm, in particular between 470 nm and 480 nm, further in particular 475 nm.

According to a further embodiment, the second light output has a lower correlated color temperature than the first light output, wherein the correlated color temperature of the second light output in particular is below 3500 K and wherein the correlated color temperature of the first light output in particular is above 3500 K.

According to a further embodiment, the switching from the nominal night time mode of operation to the intermediate mode of operation comprises an up-dimming transition, with the up-dimming transition in particular lasting between 0.2 s and 2 s, more in particular between 0.5 s and 1.5 s.

According to a further embodiment, the method further comprises the step of switching from the intermediate mode of operation back to the nominal night time mode of operation. The switching from the intermediate mode of operation back to the nominal mode of operation may comprise a down-dimming transition, with the down-dimming transition in particular lasting between 2 s and 20 s.

BRIEF DESCRIPTION OF THE DRAWINGS

Further exemplary embodiments of the invention are described below with respect to the accompanying Figures, wherein.

DETAILED DESCRIPTION

Figure 1:
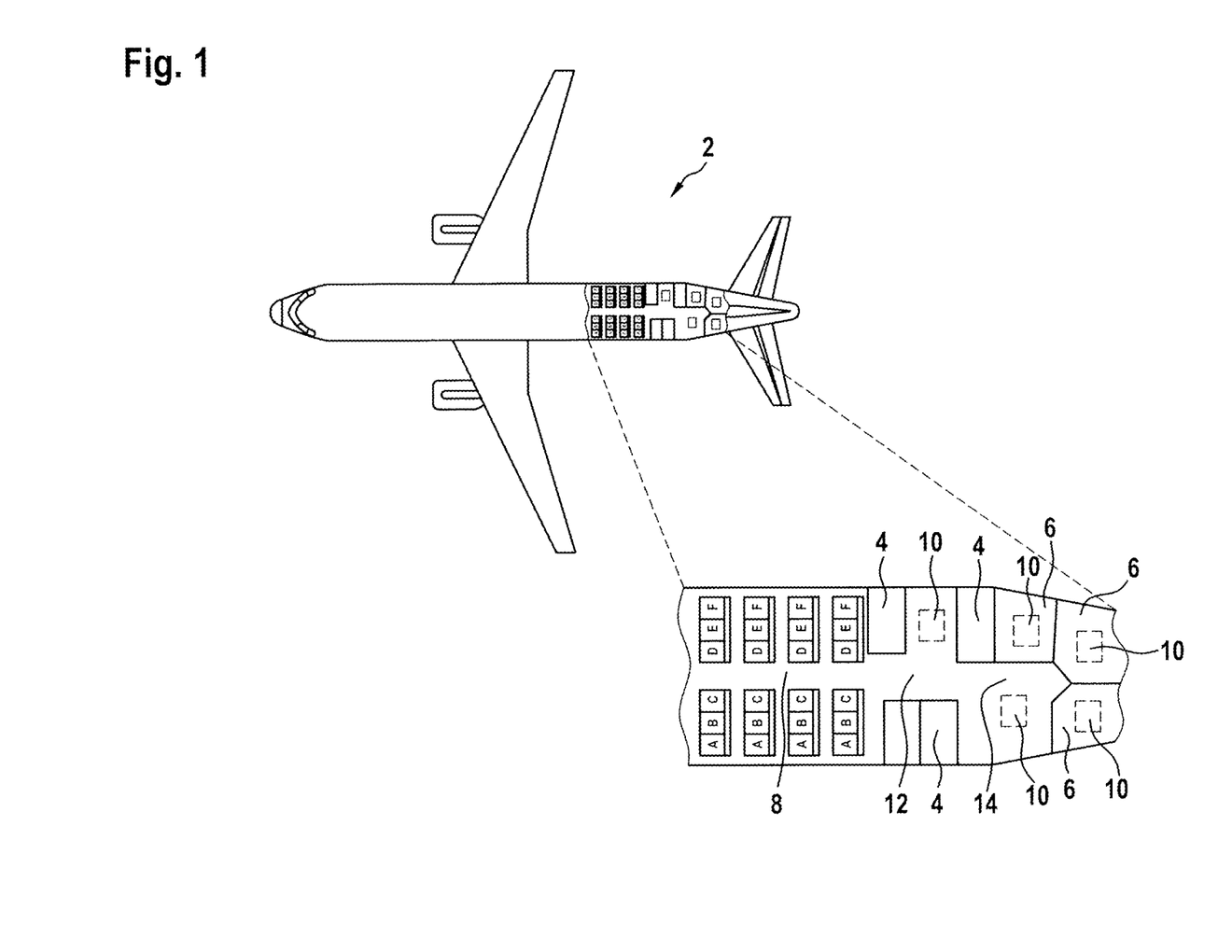
FIG. 1 shows an aircraft in accordance with an exemplary embodiment of the invention, the aircraft being shown in a top view and being shown as partially cut open for illustrating the interior of the aircraft, which is equipped with a plurality of aircraft cabin lighting arrangements in accordance with exemplary embodiments of the invention.

FIG. 1 shows an aircraft 2 in accordance with an exemplary embodiment of the invention. While the aircraft 2, which is a large commercial passenger airplane, is shown in a top view, a rear portion of the aircraft 2 is depicted in a cut-open manner, in order to view the interior of the aircraft 2 there.

In the cut-open portion, a rear end of the seating portion 8 of the aircraft is depicted. In particular, the last four seating rows of the seating portion 8 of the aircraft 2 are shown. In general, the seats of the aircraft and the aisle(s) between the seats are considered the seating portion 8 of the aircraft 2.

Behind the seating portion 8, there are provided three galleys 4 and three wash rooms 6. The space in between the galleys 4 is considered the galley area 12. This galley area 12 is predominantly used by the crew members for preparing passenger service, such as food and beverage service, as well as for cleaning up and discarding trash. The space in between the galleys 4 and the wash rooms 6 is considered the wash room waiting area 14. This space is predominantly used by passengers when waiting for a wash room 6 or when stretching during long flights. It is possible that said wash room waiting area 14 is also used by the crew members for their various on-board tasks.

The galley area 12, the wash room waiting area 14, and the wash rooms 6 are examples of common spaces of an aircraft. The term common space of an aircraft refers to a space that is jointly used by various passengers and/or crew members, without being intermediately linked to the seating space. Thus, the aisle(s) may not be considered a common space in the context of the present document. It is a characteristic of the common space of the aircraft that it may be occupied/used by persons at times during the flight, while being void of any persons at other times.

In the cut-open portion of the exemplary aircraft 2 of FIG. 1, there are provided five aircraft cabin lighting arrangements 10, which are all in accordance with an exemplary embodiment of the invention. One aircraft cabin lighting arrangement 10 is arranged in the galley area 12, one aircraft cabin lighting arrangement 10 is arranged in the wash room waiting area 14, and three aircraft cabin lighting arrangements 10 are arranged in the three washrooms 6. Each aircraft cabin lighting arrangement 10 is provided for illuminating a portion of the common space of the aircraft 2.

It is pointed out that the arrangement of the aircraft cabin lighting arrangements 10 is exemplary only and that other arrangements are possible as well. For example, aircraft cabin lighting arrangements in accordance with exemplary embodiments of the invention may only be present in a part of the common spaces of the aircraft 2, while another part of the common spaces of the aircraft 2 may be illuminated with other aircraft cabin lights. Also, it is possible to provide a single aircraft cabin lighting arrangement 10 for illuminating various common spaces of the aircraft 2, such as a single aircraft cabin lighting arrangement 10 for illuminating both the galley area 12 and the wash room waiting area 14.

In the exemplary embodiment of FIG. 1, all aircraft cabin lighting arrangements 10 are constructed in accordance with the exemplary embodiment of FIG. 2 and are operated in accordance with the operational regime described below with respect to FIG. 3. The aircraft cabin lighting arrangements 10 of the exemplary embodiment of FIG. 1 are provided in respective ceiling portions of the aircraft cabin and are therefore depicted in dotted lines in FIG. 1. It is pointed out, however, that one or some or all of the aircraft cabin lighting arrangements 10 may also be arranged in respective wall portions of the aircraft cabin or the wash rooms.

Figure 2:
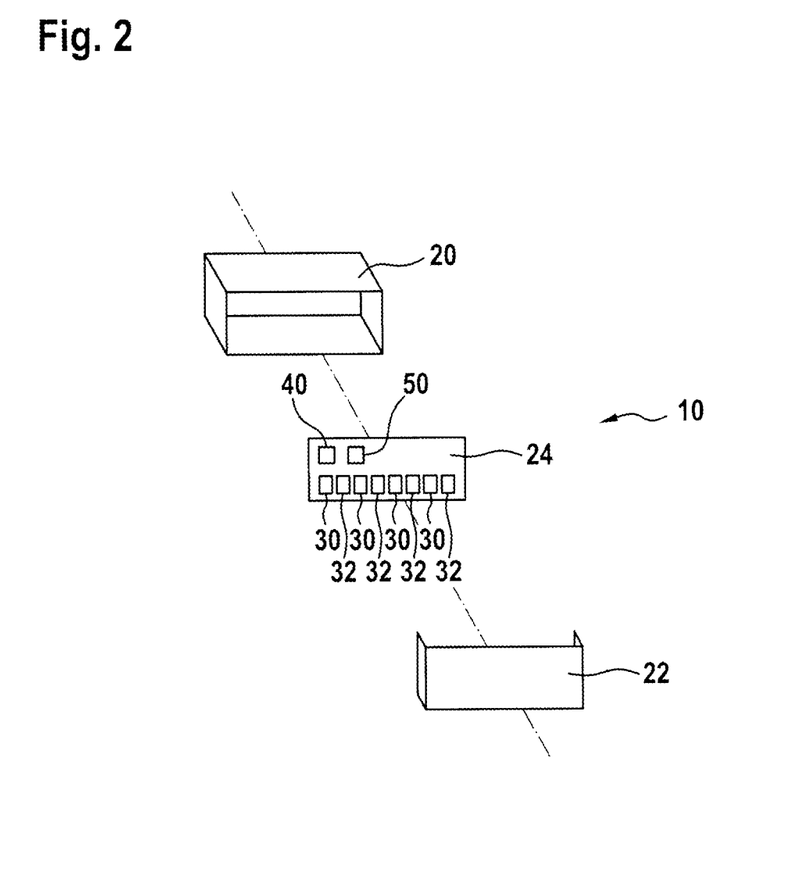
FIG. 2 shows an aircraft cabin lighting arrangement in accordance with an exemplary embodiment of the invention in a schematic exploded perspective view.

FIG. 2 shows an aircraft cabin lighting arrangement 10 in accordance with an exemplary embodiment of the invention. The aircraft cabin lighting arrangement 10 has a housing 20, a circuit board 24, and a light output lens 22. The housing 20, the circuit board 24, and the light output lens 22 are depicted in an exploded perspective view in FIG. 2. It is understood that these components are mounted to each other before the aircraft cabin lighting arrangement 10 is used in the aircraft cabin. In particular, the circuit board 24 is arranged within the housing 20, which in turn is closed off by the light output lens 22. The light output lens 22 is translucent and, thus, passes light from the inside of the housing 20 to the outside, i.e. to the common space of the aircraft.

The circuit board 24 supports a plurality of neutral white LEDs 30, which are also referred to as a first subset of light sources. The circuit board 24 further supports a plurality of warm white LEDs 32, which are also referred to as a second subset of light sources. In the exemplary embodiment of FIG. 2, the aircraft cabin lighting arrangement 10 has four neutral white LEDs 30 and four warm white LEDs 32, which are arranged in an alternating order. It is understood that the number of light sources and their arrangement is exemplary only and may be adapted in any suitable manner. The circuit board 24 further supports a detector 40 for detecting a person's presence in the common space and a control circuit 50, which may be a microprocessor or any other suitable kind of control circuit. The plurality of light sources 30, 32 and the detector 40 are arranged within the space provided by the housing 20 and the light output lens 22. In this way, an integrated aircraft cabin light is provided.

The aircraft cabin lighting arrangement 10 has at least the following modes of operation: a nominal day time mode of operation, a nominal night time mode of operation, and an intermediate mode of operation. In the nominal day time mode of operation, the neutral white LEDs 30 are turned on and the warm white LEDs 32 are turned off. In this way, the aircraft cabin lighting arrangement 10 provides for a high level of illumination with neutral white light. In the nominal night time mode of operation, the neutral white LEDs 30 are turned off, and the warm white LEDs 32 are turned on. However, the warm white LEDs 32 are strongly dimmed, such that only a comparably very low level of illumination is present. In the intermediate mode of operation, the neutral white LEDs 30 are turned off, and the warm white LEDs 32 are turned on. The warm white LEDs 32 are operated at a medium level of dimming in the intermediate mode of operation, such that an illumination with an intermediate brightness level and warm white light is provided.

The control circuit 50 controls the on/off switching of the neutral white LEDs 30 and the warm white LEDs 32 as well as their level of dimming. In particular, the control circuit 50 controls the neutral white LEDs 30 and the warm white LEDs 32 in accordance with two inputs in the exemplary embodiment of FIG. 2. The first input is a distinction between nominal day time and nominal night time, as provided by a crew member or a pilot of the aircraft. The terms nominal day time and nominal night time are used to indicate that periods of comparably strong illumination and periods of comparably weak illumination may generally correspond to the presence of day or night outside of the aircraft, but may also deviate therefrom, e.g. for providing food and beverage service in the aircraft cabin. The second input to the control circuit 50 is an output of the detector 40, indicating whether or not a person is present in the common space illuminated by the aircraft cabin lighting arrangement 10.

The control circuit 50 controls the aircraft cabin lighting arrangement 10 in accordance with above described two inputs as follows. Upon receiving the nominal day time indication from the crew member or pilot, the nominal day time mode of operation is entered and a bright illumination of the common space with neutral white light is provided. When a nominal night time indication is provided by the crew member or pilot, the nominal night time mode of operation is entered and above described comparably very low illumination of the common space with warm white light is provided. However, in said nominal night time mode of operation, the control circuit 50 is configured to react to an indication of a person's presence in the common space from the detector 40. In particular, when receiving an indication about a person's presence in the common space from the detector 40, the intermediate mode of operation is entered and an intermediate level of illumination with warm white light is provided by the aircraft cabin lighting arrangement 10.

In this way, the aircraft cabin lighting arrangement 10 provides for bright illumination of the common space in the nominal day time mode of operation, provides for a low amount of illumination for safety purposes in the nominal night time mode of operation, and provides for an intermediate level of illumination in the intermediate mode of operation. The intermediate mode of operation allows for the passengers and/or crew members to find their way in the common space, while at the same time keeping the disturbance of the circadian rhythm of the passengers low due to the usage of warm white light. Further, the automatic switching from the nominal night time mode of operation to the intermediate mode of operation provides for a low amount of disturbance of the passengers, because the low illumination nominal night time mode of operation can be used whenever no one needs a higher level of illumination.

While it has been described above that only the neutral white LEDs are used in the nominal day time mode of operation and only the warm white LEDs 32 are used in the nominal night time mode operation and the intermediate mode of operation, it is understood that this selection of light sources is exemplary only. It is for example also possible that the warm light LEDs 32 are dominant in the nominal night time mode of operation and the intermediate mode of operation, with some illumination being provided by the neutral white LEDs 30, while the neutral white LEDs 30 are dominant in the day time mode of operation, with some illumination being provided by the warm white LEDs 32. Also in such a scenario, the low disturbance of the passenger's rest phase is ensured by the light output of the intermediate mode of operation having a lower relative light emission power below a threshold wavelength than the light output of the nominal day time mode of operation.

In the exemplary embodiment of FIG. 2, the detector 40 is a motion detector relying on photo imaging technology. The detector 40 may be any kind of suitable motion detector. It may also be an infrared detector for detecting a person's body heat.

Figure 3:
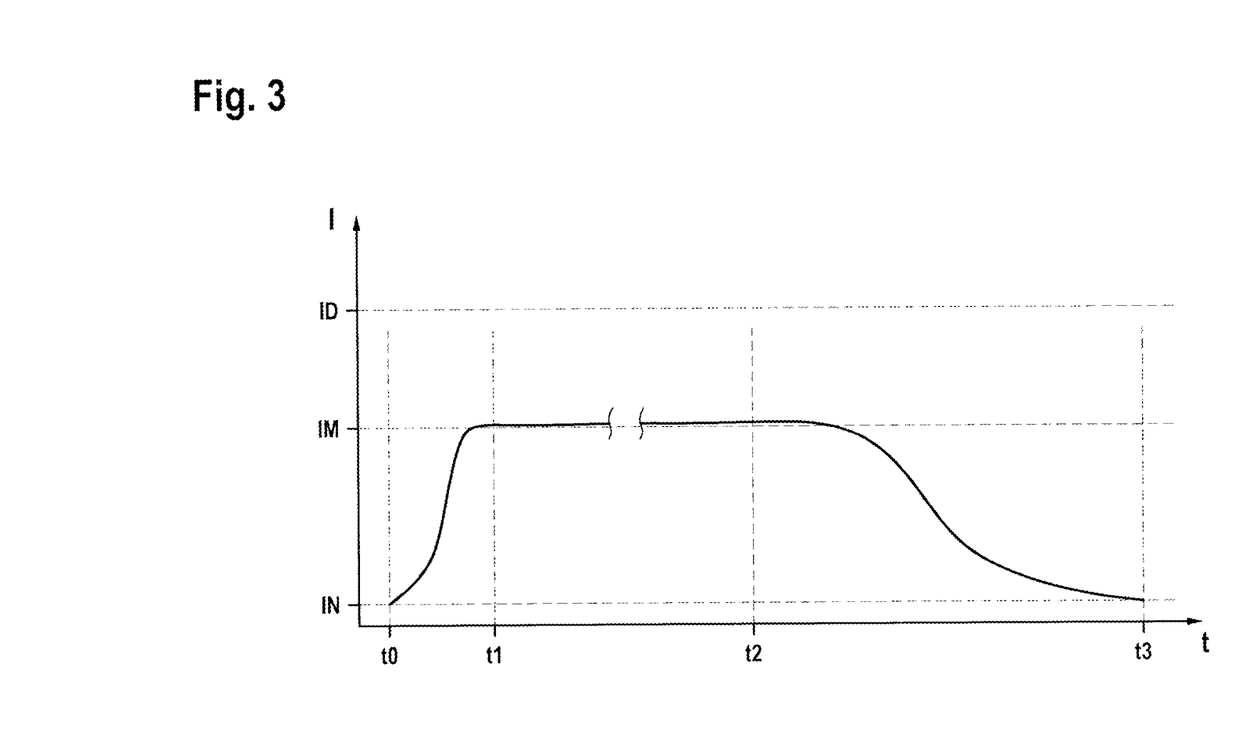
FIG. 3 shows an exemplary course of the illumination level of an aircraft cabin lighting arrangement in accordance with an exemplary embodiment of the invention.

FIG. 3 shows an exemplary course of the level of illumination provided by the aircraft cabin lighting arrangement 10 of FIGS. 1 and 2. In particular, FIG. 3 illustrates the switching from the nominal night time mode of operation to the intermediate mode of operation and back to the nominal night time mode of operation. FIG. 3 shows the level of illumination of the aircraft cabin lighting arrangement over time. Neither the time axis nor the illumination axis are to scale. Rather, FIG. 3 illustrates the qualitative switching behaviour of the aircraft cabin lighting arrangement. The illumination levels are given as illuminance levels. However, it is also possible to measure the illumination in terms of the total output power or the respective peak light intensity values or any other suitable measure. On the illumination axis, the nominal day time illumination level ID, as emitted in the nominal day time mode of operation, the intermediate illumination level IM, as emitted in the intermediate mode of operation, and the nominal night time illumination level IN, as emitted in the nominal night time mode of operation, are indicated.

At t=t0, the detector 40 detects a person's presence in the common space. This detection triggers the switching from the nominal night time mode of operation to the intermediate mode of operation. Between t=0 to and t=t1, the illumination level is raised from the nominal night time illumination level IN to the intermediate illumination level IM. The interval between t=t0 and t=t1 lasts about 1 s in the exemplary embodiment of FIG. 3. The raise in illumination level follows an s-shaped curve, having an increasing gradient for roughly the first half of the transition and a decreasing gradient for roughly the second half of the transition.

At t=t2, an interval of no activity in the common space of 1 min has elapsed since the detector last detected a person's presence in the common space. This elapsing of 1 min after the last detected activity in the common space triggers a switch back to the nominal night time mode of operation at t=t2. Between t=t2 and t=t3, the illumination level decreases from the intermediate illumination level IM to the nominal night time illumination level IN. The interval between t=t2 and t=t3 is 10 s in the exemplary embodiment of FIG. 3. The decrease also takes place in accordance with an s-shaped curve, having an increasing gradient for roughly the first half of the transition and a decreasing gradient for roughly the second half of the transition. After t=t3, the aircraft cabin lighting arrangement is back in the nominal night time mode of operation.

In the exemplary embodiment of FIG. 3, the nominal night time illumination level is between 1% and 10% of the nominal day time illumination level ID. The intermediate illumination level IM is between 30% and 50% of the nominal day time illumination level ID.

Figure 4:
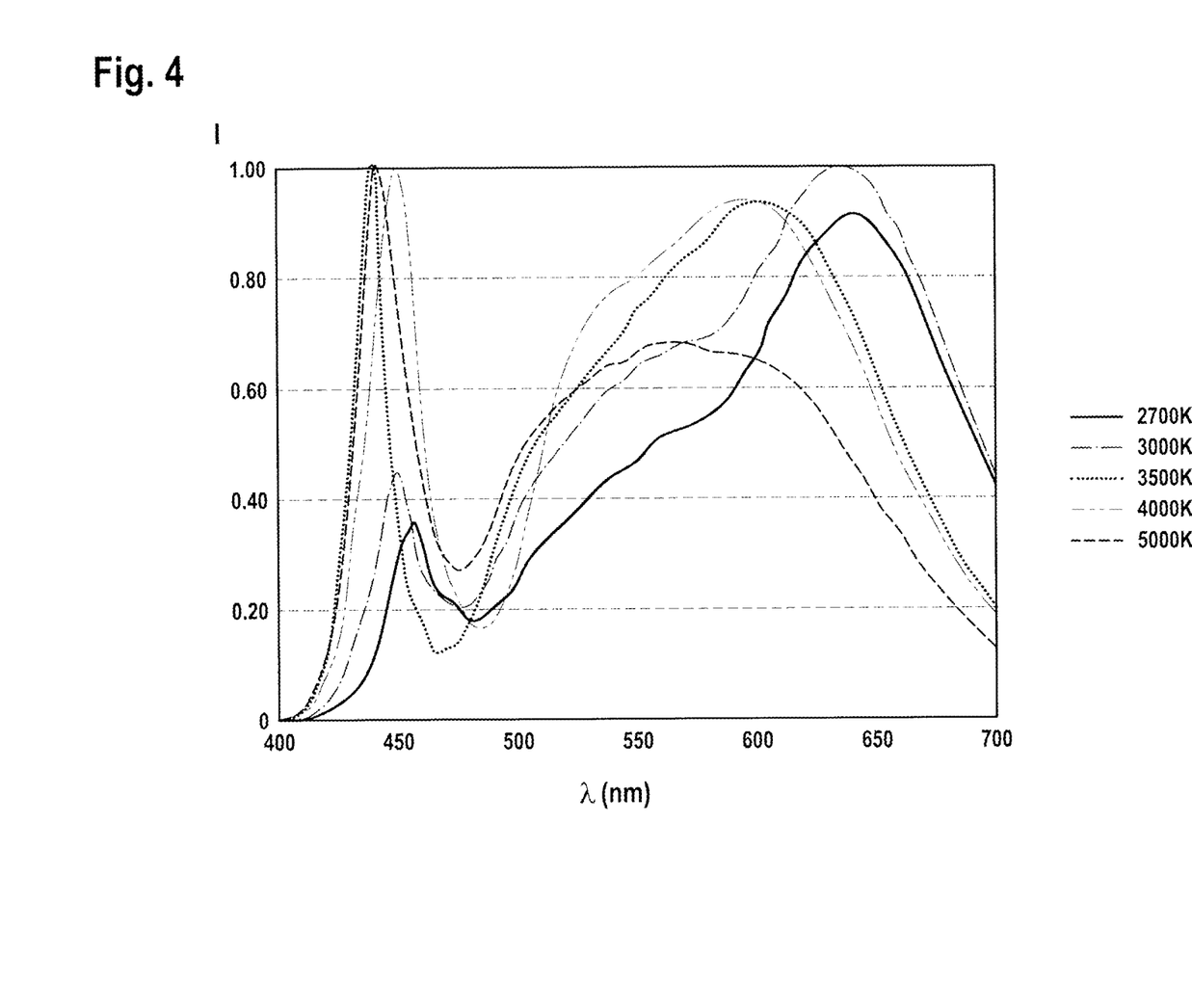
FIG. 4 shows different light emission spectra of light sources that may be used in aircraft cabin lighting arrangements in accordance with exemplary embodiments of the invention.

FIG. 4 illustrates a plurality of light emission spectra of exemplary light sources that may be used for aircraft cabin lighting arrangements in accordance with exemplary embodiments of the invention. The different light emission spectra correspond to different correlated color temperatures (cct), respectively. The wavelength λ (in nm) is plotted in the horizontal x-axis, while the relative intensity I is plotted on the vertical y-axis.

FIG. 4 in particular illustrates that the peak performance in the range between 550 nm and 700 nm shifts to shorter wavelengths, i.e. to the "blue end" of the spectrum on the left side, when the correlated color temperature is increased. This illustrates that light having a relatively high correlated color temperature comprises a larger portion of blue light than light having a lower correlated temperature. In other words, the spectrum of the light is shifted from red to blue when the correlated color temperature is increased, and it is shifted from blue to red when the correlated color temperature is decreased. All depicted spectra result in the emission of white light, just composed differently and with different contents of spectral components.

In accordance with exemplary embodiments of the invention, light having a relatively low correlated color temperature, e.g. light having a correlated color temperature of less than 3500 K may be used for the nominal night time mode of operation and the intermediate mode of operation, and light having a relatively high correlated color temperature, e.g. light having a correlated color temperature of more than 3500 K, may be used for the nominal day time mode of operation. The light emission spectra of the curves denoted with 2700 K and 3000 K are examples of light emission spectra of LEDs that may well be used as the warm white LEDs discussed above. The light emission spectra of the curves denoted with 4000 K and 5000 K are examples of light emission spectra of LEDs that may well be used as the neutral white LEDs discussed above. For a threshold wavelength of 500 nm, the peak value below the threshold wavelength is less than 50% of the peak value above the threshold wavelength for the curves denoted with 2700 K and 3000 K. For the curves denoted with 4000 K and 5000 K, the peak value below the threshold wavelength is above the peak value above the threshold wavelength.

Figure 5:
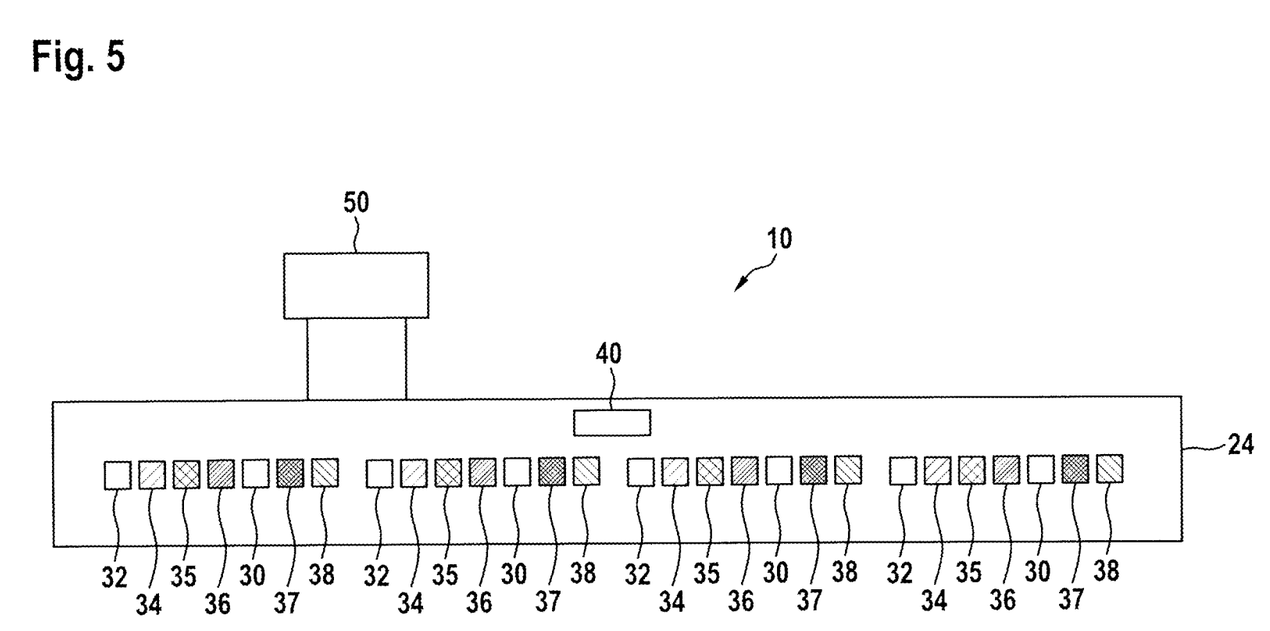
FIG. 5 shows an aircraft cabin lighting arrangement in accordance with another exemplary embodiment of the invention in a schematic view.

FIG. 5 shows an aircraft cabin lighting arrangement 10, in particular selected components of an aircraft cabin lighting arrangement 10, in accordance with another exemplary embodiment of the invention. Like components are denoted with like reference numerals as in FIG. 2, and reference is made to their description above. The ensuing description is focused on the differences with respect to the FIG. 2 embodiment.

The aircraft cabin lighting arrangement 10 comprises 28 LEDs arranged on the circuit board 24. In particular, the aircraft cabin lighting arrangement 10 comprises four neutral white LEDs 30, four warm white LEDs 32, four blue LEDs 34, four red LEDs 35, four green LEDs 36, four amber LEDs 37, and four mint LEDs 38. The LEDs of the seven different colors are arranged in alternating order.

With the different color LEDs, the light output in the nominal day time mode of operation and the intermediate mode of operation may be adapted with many degrees of freedom. In particular, various shades of light can be provided with the different light sources and different dimming levels thereof. For example, the second light output, i.e. the light output of the intermediate mode of operation, may involve dominant light emission by the warm white LEDs 32, the red LEDs 35, the green LEDs 36, the amber LEDs 37 and the mint LEDs 38, with the neutral white LEDs 30 and the blue LEDs 35 contributing no or only a small amount of light. Conversely, the first light output, i.e. the light output of the nominal day time mode of operation, may involve dominant light emission by the neutral white LEDs 32 and the blue LEDs 35. It is understood that various combinations of LEDs and dimming levels are possible, as long as the second light output has an overall lower relative light emission power below the threshold wavelength than the first light output.

In the exemplary embodiment, the control circuit 50 is provided as a separate component that is not arranged on the circuit board 24. In particular, it is possible that the control is performed by a stand alone control unit that is connected to the detector 40 for receiving its output and connected to the LEDs for controlling the same.

Moreover, the detector 40 may also be a stand alone component that is arranged outside of the circuit board 24 or even arranged outside of the housing, which houses the plurality of light sources and is closed by the light output lens. Due to its coupling to the LEDs, e.g. via the control circuit 50, such a detector is still considered to be part of the aircraft cabin lighting arrangement 10.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An aircraft cabin lighting arrangement for illuminating a common space of an aircraft, comprising:
   a light output lens for passing light for illuminating said common space of the aircraft;
   a plurality of light sources having different light emission spectra, the plurality of light sources being arranged for light emission through the light output lens; and
   a detector for detecting a person's presence in the common space;
   wherein the aircraft cabin lighting arrangement has at least a nominal day time mode of operation having a first light output, an intermediate mode of operation having a second light output, and a nominal night time mode of operation,
   wherein the aircraft cabin lighting arrangement has a control that is configured to override the nominal night time mode of operation and to switch from the nominal night time mode of operation to the intermediate mode of operation as a response to the detector detecting a person's presence in the common space and wherein the control is configured to switch from the nominal night time mode of operation to the intermediate mode of operation via an up-dimming transition lasting between 0.2 s and 2 s, wherein the second light output has a lower relative light emission power below a threshold wavelength than the first light output, wherein the threshold wavelength is between 450 nm and 500 nm, and wherein the common space is a galley area, a wash room, or a wash room waiting area.

2. An aircraft cabin lighting arrangement according to claim 1, wherein the second light output has a lower correlated color temperature than the first light output, wherein the correlated color temperature of the second light output in particular is below 3500 K and wherein the correlated color temperature of the first light output in particular is above 3500 K.

3. An aircraft cabin lighting arrangement according to claim 1, wherein a first subset of the plurality of light sources is dominant in the nominal day time mode of operation and wherein a second subset of the plurality of light sources, different from the first subset, is dominant in the intermediate mode of operation.

4. An aircraft cabin lighting arrangement according to claim 3, wherein the first subset of the plurality of light sources comprises at least one neutral white LED and/or wherein the second subset of the plurality of light sources comprises at least one warm white LED.

5. An aircraft cabin lighting arrangement according to claim 1, wherein the detector is a motion detector or an infrared detector or a combined motion and infrared detector.

6. An aircraft cabin lighting arrangement according to claim 1, wherein the control is configured to switch from the intermediate mode of operation to the nominal night time mode of operation via a down-dimming transition, with the down-dimming transition in particular lasting between 2 s and 20 s.

7. An aircraft comprising:
at least one aircraft cabin lighting arrangement in accordance with any claim 1, wherein the at least one aircraft cabin lighting arrangement is arranged in at least one of: a galley area; a wash room; and a wash room waiting area.

8. An aircraft according to claim 7, wherein the at least one aircraft cabin lighting arrangement is arranged in a ceiling portion or a wall portion of said at least one of a galley area, a wash room, and a wash room waiting area, with the light output lens being flush with the ceiling portion or the wall portion.

9. A method of operating an aircraft cabin lighting arrangement for illuminating a common space of an aircraft, wherein the common space is a galley area, a wash room, or a wash room waiting area, the method comprising:
emitting a first light output into the common space of the aircraft in a nominal day time mode of operation;
emitting a second light output into the common space of the aircraft in an intermediate mode of operation, wherein the second light output has a lower relative light emission power below a threshold wavelength than the first light output, wherein the threshold wavelength is between 450 nm and 500 nm; and
emitting a third light output into the common space of the aircraft in a nominal night time mode of operation;
wherein the method further comprises the step of:
when operating in the nominal night time mode of operation and detecting a person's presence in the common space of the aircraft, overriding the nominal night time mode of operation and switching from the nominal night time mode of operation to the intermediate mode of operation, wherein the switching from the nominal night time mode of operation to the intermediate mode of operation comprises an up-dimming transition lasting between 0.2 s and 2 s.

10. A method according to claim 9, wherein the second light output has a lower correlated color temperature than the first light output, and the correlated color temperature of the second light output is below 3500 K and the correlated color temperature of the first light output in particular is above 3500 K.

11. A method according to claim 9 further comprising:
switching from the intermediate mode of operation back to the nominal night time mode of operation, with the switching from the intermediate mode of operation back to the nominal mode of operation in particular comprising a down-dimming transition, with the down-dimming transition lasting between 2 s and 20 s.

* * * * *